No. 755,437.

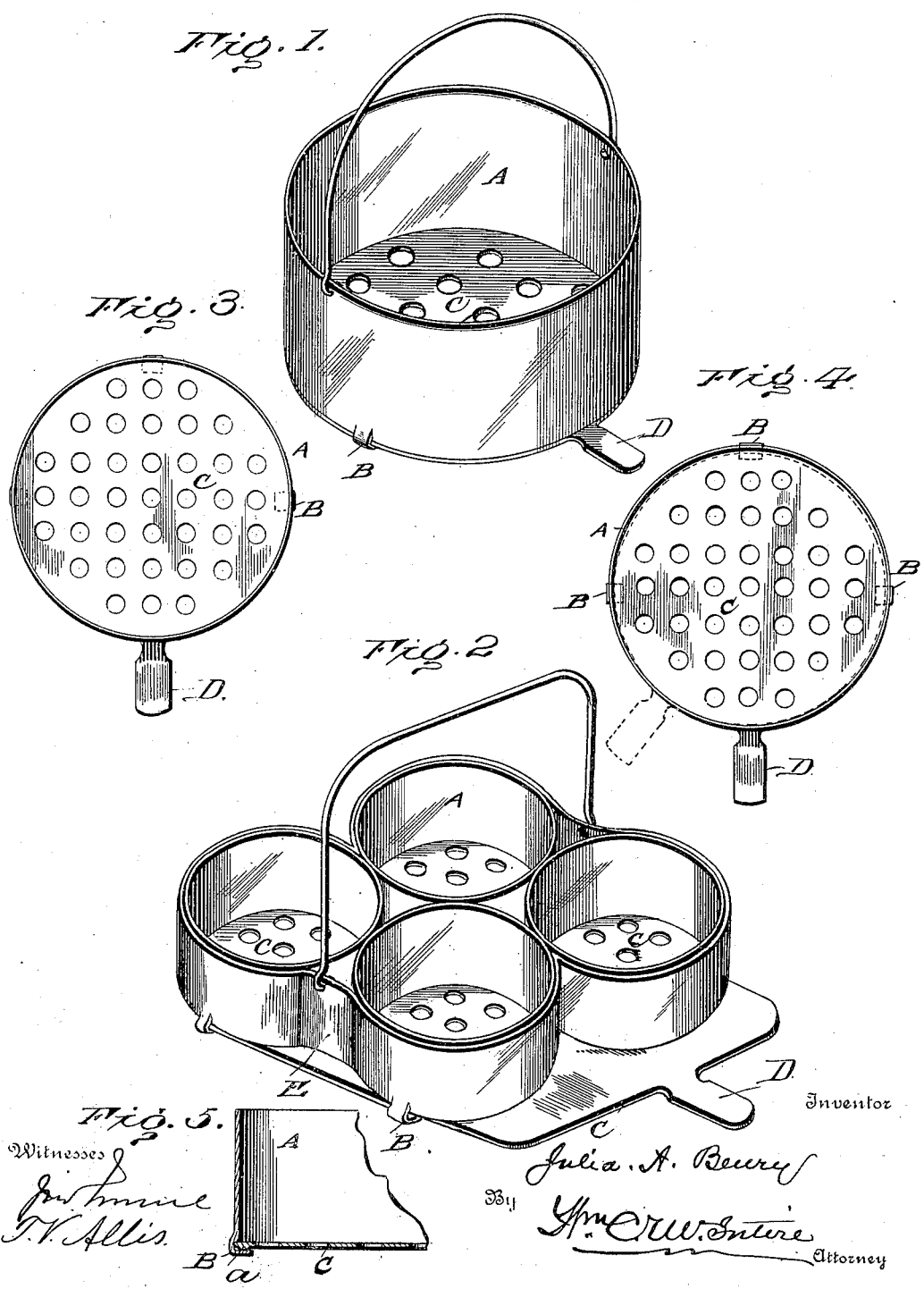

Patented March 22, 1904.

UNITED STATES PATENT OFFICE.

JULIA A. BEURY, OF BEURY, WEST VIRGINIA.

EGG-POACHER.

SPECIFICATION forming part of Letters Patent No. 755,437, dated March 22, 1904.

Application filed December 7, 1903. Serial No. 184,097. (No model.)

*To all whom it may concern:*

Be it known that I, JULIA A. BEURY, a citizen of the United States, residing at Beury, in the county of Fayette and State of West Virginia, have invented certain new and useful Improvements in Egg-Poachers; and I do hereby declare the following to be a full, clear, and exact description of the invention, such as will enable others skilled in the art to which it appertains to make and use the same.

My invention relates to certain new and useful improvements in devices for poaching eggs.

It has for its object simplicity and economy in construction and facility of use.

Utensils designed for poaching eggs are generally so constructed that the egg after it has been subjected to the action of boiling water is removed by passing the strainer device under the egg to remove it from the water, or else the egg if poached on the device is removed therefrom by the action of gravity, and in either case there is liability of rupture of the egg. My invention is designed to overcome this objection; and with that end in view it consists of an egg-receptacle adapted to be placed in boiling water and provided with a perforated sliding bottom, the wall or walls of the receptacle serving to hold the egg stationary while the sliding bottom is removed, as will be hereinafter and in detail explained.

In order that those skilled in the art may know how to make and use my invention, I will proceed to describe the same, referring by letters to the accompanying drawings, in which—

Figure 1 is a perspective view of a single egg-receptacle embodying my invention. Fig. 2 is a similar view of a series of receptacles combined or joined together and provided with a single bottom closing the series of receptacles. Fig. 3 is a plan view of my invention, and Fig. 4 is a perspective view showing a modified form of construction involving a different manner of securing the bottom in position, and Fig. 5 is a partial detail section showing another modified form of connection between the bottom and the vessel.

Similar letters of reference indicate like parts in the several figures.

A is a cup or ring of any suitable material, such as tin or sheet-iron, enameled, and of any desired contour, but preferably circular. The lower edge of the cup A is formed with preferably three tongues B, turned inwardly to constitute three radial supports for the perforated bottom C, which is provided with a handle D and adapted to close the bottom of the ring A. By reference to Fig. 4 it will be seen that the bottom may be made slightly eccentric, as indicated in dotted lines, so that if it is rotated slightly the enlarged circumference will pinch or bind within the tongues B, owing to the fact that the greatest area between the oppositely-located tongues B is less than that of the eccentric or longer portion of the said bottom C, or it may be made absolutely concentric, as shown in Fig. 5, and provided with lugs *a*, adapted to interlock with the tongues B.

When a series of receptacles are combined in one utensil, as shown in Fig. 2, they may be secured together at their planes of contact by solder or otherwise and by a surrounding band E. When this band E is employed, the lower edge thereof is provided with radial tongues B, and such tongues are omitted from the walls of the individual receptacles.

The single or multiple receptacle is provided with a bail for handling the same when lowering it into or removing it from the water. It will be observed that the wall of each individual receptacle constitutes a continuous surrounding brace to support the cooked egg while the bottom is being removed and that where a series of receptacles are joined to constitute a multiple poacher each egg is kept separate not only during the cooking process, but during the removal of the eggs to the dish or platter, and consequently do not join or tend to break one another.

The side wall or body of the receptacle A is non-perforated, while the sliding and removable bottom C is perforated, and as a result of these conditions when the receptacle is removed from the boiling water such portion of the said water as is contained within the receptacle A gravitates in vertical lines through the perforations and gently deposits the egg or eggs upon the perforated bottom and avoids the possibility of undue agitation tending to break the egg or eggs, which would be the case if the water escaped from the vessel in lateral as well as vertical direction. I prefer to make the egg-receptacles cylindrical in horizontal section in order that the wall shall be concentric with the ordinary circular form of the yolk of an egg, so that the pressure exerted by the wall when the perforated bottom is withdrawn will be more equally distributed against the egg, and thus avoid any tendency to breakage.

What I claim as new, and desire to secure by Letters Patent, is—

1. As a new article of manufacture, an egg-poacher consisting of one or more receptacles having non-perforate walls or bodies, and a perforated bottom provided with a handle D, and supported in position by radial tongues B, substantially as hereinbefore set forth.

2. In combination with a receptacle A, having radial tongues B, the perforated bottom C of eccentric contour, the greater area of which is greater than the area between the oppositely-disposed tongues B, and provided with a handle D, substantially as and for the purpose set forth.

In testimony whereof I have signed my name to this specification in the presence of two subscribing witnesses.

JULIA A. BEURY.

Witnesses:
DAISY E. BEURY,
J. W. DANIEL.